Patented Oct. 5, 1937

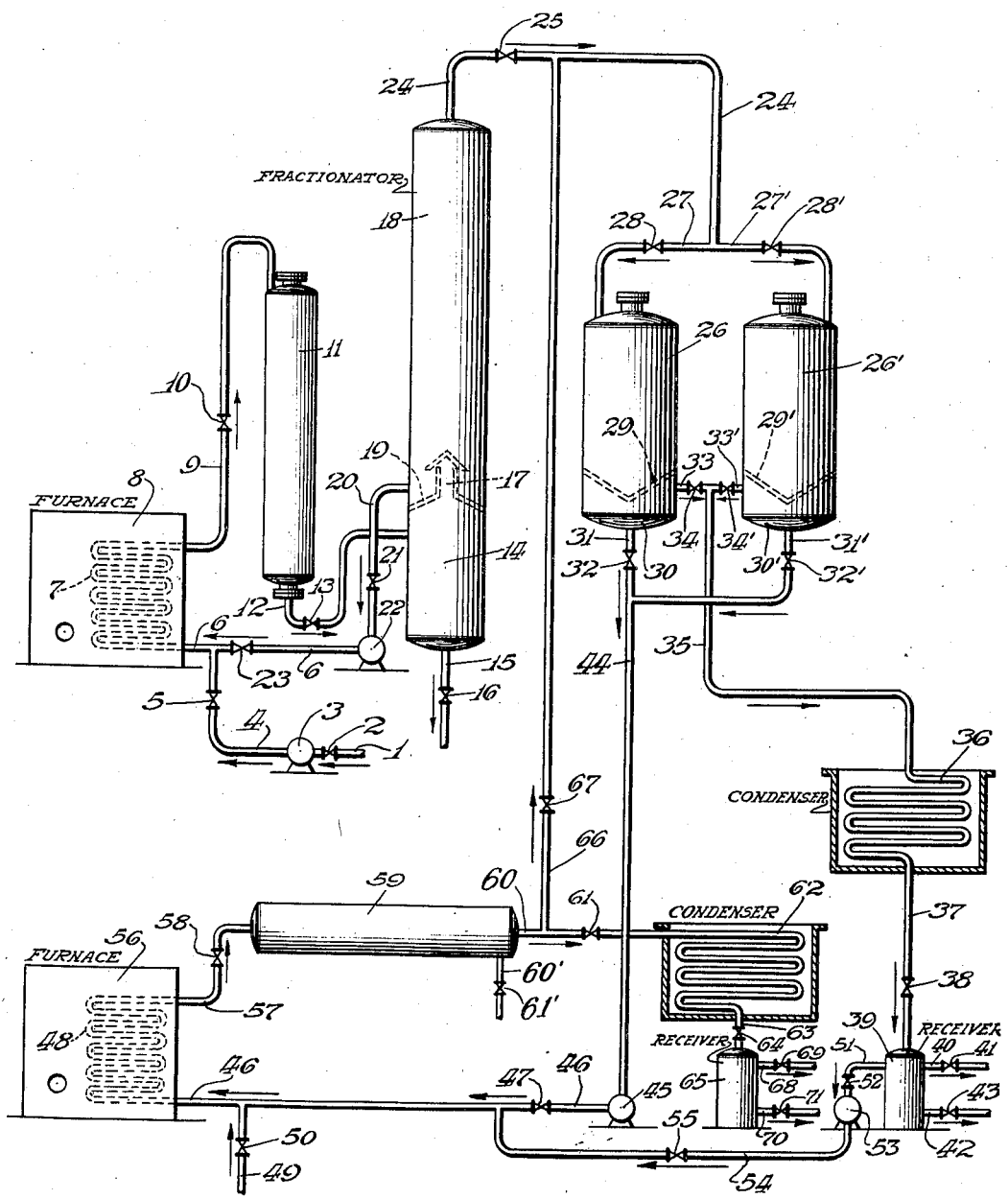

2,094,907

UNITED STATES PATENT OFFICE 2,094,907

TREATMENT OF HYDROCARBON OILS

Jean Delattre Seguy, Chicago, Ill., assignor, by mesne assignments, to Universal Oil Products Company, Chicago, Ill., a corporation of Delaware Application December 30, 1931, Serial No. 583,798

9 Claims. (Cl. 196—53)

This invention relates to the treatment of hydrocarbon oils and more particularly refers to the conversion of hydrocarbon oils for the production of substantial yields of desirable light products, such as motor fuel of high anti-knock value.

An object of the present invention comprises subjecting a hydrocarbon oil to pyrolytic conversion, subjecting the desirable light products of such conversion while in a heated vaporous state to polymerization treatment and subjecting the resulting polymers to hydrogenation for the purpose of increasing the yield as well as the quality of desirable light products such as, for example, finished motor fuel of high anti-knock quality.

In one of its more specific embodiments, the invention may comprise subjecting a hydrocarbon oil to conversion conditions of elevated temperature and substantial superatmospheric pressure in a heating element, introducing the heated material into an enlarged reaction zone, also preferably maintained at a substantial superatmospheric pressure, withdrawing both liquid and vaporous products from said reaction zone to a zone of reduced pressure where further vaporization of the residual liquid is effected, subjecting vapors from said zone of reduced pressure to fractionation whereby their insufficiently converted components are condensed to be returned to the heating element for further conversion, subjecting vapors from the fractionating zone to contact and treatment with polymerizing material for the purpose of producing polymerization of unstable components of the vapors and improving their quality, subjecting vapors resulting from said polymerization treatment to condensation and cooling and collecting the resulting distillate and gas, supplying polymers separated from the vapors to a heating element where they are heated in the presence of hydrogen and/or hydrogen containing gas for the purpose of effecting their substantial hydrogenation and introducing materials from said heating element into a soaking zone where their conversion may continue, products from which may be separately condensed, cooled, collected, or may be returned to polymerizing treatment together with vapors from the fractionator.

The attached diagrammatic drawing serves to illustrate one specific form of apparatus in which the principles of the present invention are embodied. The following description of the drawing includes a description of the process of the invention as it may be practiced in the apparatus illustrated.

The raw oil charging stock to be treated may be supplied through line 1 and valve 2 to pump 3 from which it is fed through line 4 and valve 5 and line 6 to heating element 7. Heating element 7 is located in furnace 8 of any suitable form and the oil supplied thereto is heated to a desired conversion temperature, preferably at a substantial superatmospheric pressure. The heated materials are discharged from heating element 7 through line 9 and valve 10 to reaction chamber 11 which is also preferably heated at a substantial superatmospheric pressure and wherein conversion, particularly with the vaporous products introduced into this zone, is continued. Both vaporous and non-vaporous conversion products are withdrawn from chamber 11 through line 12 and valve 13, passing to reduced pressure vaporizing chamber 14 where, by virtue of the latent heat the residual oil from chamber 11 is further vaporized and cooled. The residual liquid remaining in chamber 11 unvaporized may be withdrawn therefrom through line 15 and valve 16 to cooling and storage, or to any desired further treatment. Vapors from chamber 14 pass through a baffle or other suitable device, such as illustrated at 17, to fractionation in fractionator 18 wherein their relatively heavy components of an insufficiently converted character are condensed, collecting upon deck or tray 19 in the lower portion of the fractionator to be withdrawn therefrom through line 20 and valve 21 to pump 22. Pump 22 supplies the reflex condensate from fractionator 18 through line 6 and valve 23 to further conversion in heating element 7.

The vapors, preferably comprising cracked products of substantially motor fuel boiling range may be withdrawn from the upper portion of fractionator 18 through line 24 and valve 25 and pass into treating chamber 26 through line 27 and valve 28, or into treating chamber 26' through line 27' and valve 28'. Chambers 26 and 26' are vapor treating zones wherein polymerization of unstable gum and color-forming material within the vapors is accomplished. Any suitable polymerizing material, such as, for example, fullers earth, diatomaceous earth, contact clays, and heavy metal salts such as the chlorides of iron, aluminum, zinc, etc., or mixtures of these polymerizing agents and the like, may be disposed within the treating chambers, preferably comprising a bed of such material, not illustrated, within each chamber supported, for example, on suitable perforated trays 29 and 29'. Polymers may collect as liquid in the lower portion of chambers 26 and 26' respectively, being withdrawn from chamber 26 through line 31 and valve 32 and from chamber 26' through line 31' and valve 32'. Treated vapors are withdrawn from chamber 26 through line 33 and valve 34 and from chamber 26' through line 33' and valve 34'. It will be understood that, although chambers 26 and 26' are shown connected in parallel, it is within the scope of the invention to employ two or more chambers in series or to employ only one such treating zone. Vapors resulting from polymerization treatment withdrawn from the treating chamber, as already described, pass through line 35 to condensation and cooling in condenser 36 from which the resulting distillate and uncondensable gas are withdrawn through line 37 and valve 38 to collection in receiver 39. Uncondensable gas may be released from receiver 39 through line 40 and valve 41. Distillate may be withdrawn from the receiver through line 42 and valve 43.

Polymers withdrawn from chambers 26 and 26', as already described, pass through line 44 to pump 45 from which they are fed through line 46 and valve 47 to heating element 48. Hydrogen from any suitable source may be introduced into line 46 through line 49 and valve 50 to commingle with the polymers passing therethrough to heating element 48. If desired, a portion or all of the uncondensable gas from receiver 39 may be withdrawn through line 51 and valve 52 to be fed by means of pump 53 through line 54 and valve 55 into line 46 and thence to heating element 48.

Heating element 48 is located within a furnace 56 of any suitable form wherein the polymers are subjected, in the presence of hydrogen and, if desired, hydrogen containing gas from receiver 39, to heating under conditions preferably under relatively high superatmospheric pressure which induce substantial hydrogenation of the polymers for the purpose of converting them into substantial quantities of lighter saturated hydrocarbons, preferably of substantially motor fuel boiling range. Catalysts may also be employed in this zone. Products from heating element 48 pass through line 57 and valve 58 to soaking zone 59 where their conversion may continue for a predetermined time. Separation of vaporous and residual liquid products may be effected in zone 59, in which case residual oil may be withdrawn therefrom through line 60' and valve 61', or when desired no separation is effected in this zone. The total products or only vapors, as desired, are withdrawn from chamber 59 through line 60 and may pass through valve 61, condenser 62, line 63 and valve 64 to separate collection in receiver 65, or they may pass all or in part, from line 60 through line 66 and valve 67 into line 24, commingling therewith with vapors withdrawn from fractionator 18 and passing therewith to further treatment already described. Uncondensable gas may be released from receiver 65 through line 68 and valve 69. Distillate may be withdrawn from the receiver through line 70 and valve 71.

Pressures employed in the system may range from substantially atmospheric to superatmospheric pressures as high as 5000 pounds or more per square inch. Conversion temperatures employed may range from 600 to 1200° F., or less. Conversion conditions employed in the heating element of the cracking portion of the system preferably employ temperatures of the order of 850 to 950° F., and substantial superatmospheric pressures of the order of 100 to 500 pounds per square inch. Substantially the same range of pressures may be employed in the reaction chamber while the succeeding vaporizing, fractionating, polymerizing, condensing, and collecting portions of the system preferably employ reduced pressures which may range, for example, from substantially atmospheric to 100 pounds or thereabouts per square inch. Preferably high superatmospheric pressures of the order of 1000 to 5000 pounds per square inch are employed in the heating element and reaction zone of the hydrogenating portion of the system, with temperatures of the order of 600 to 900° F.

As a specific example of the operation of the process of the present invention at 47° A. P. I. gravity Pennsylvania kerosene distillate is the charging stock to be treated. This oil is subjected, together with reflux condensate from the fractionator of the cracking system, to a temperature of approximately 915° F. at the outlet of the heating element. A superatmospheric pressure of approximately 400 pounds per square inch is maintained in both the heating element and the reaction chamber of the cracking system. A pressure of about 50 pounds per square inch is maintained in the vaporizing chamber and substantially equalized in the fractionator and in the vapor treating or polymerizing portion of the system, as well as in the succeeding condensing and collecting equipment. The condensate from the polymerizing treatment is subjected to hydrogenation under a pressure of approximately 3000 pounds per square inch at a temperature of approximately 850° F. in the presence of an excess of hydrogen from an external source and hydrogen containing gas from the cracking system. This operation may yield approximately 87% of 400° F., end point motor fuel having a gum content of approximately 80 mgs., 30+ color, good color and gum stability upon exposure to sunlight and an anti-knock value approximately equivalent to a blend of 85% iso-octane and 15% normal heptane. The additional products from the system are uncondensable gas of relatively high hydrogen content and a small amount of heavy residual oil.

I claim as my invention:

1. A process of hydrocarbon oil conversion, which comprises subjecting oil to pyrolytic conversion under cracking conditions of temperature and superatmospheric pressure in a heating and reaction zone and converting a substantial portion thereof into gasoline solely by pyrolytic cracking, separating vapors from unvaporized residue, subjecting the vapors to reflux condensation to separate a vaporous fraction containing a substantial proportion of gasoline-like material, returning resultant reflux condensate to the heating zone, subjecting said fraction in a polymerizing zone to polymerization of a character to convert unstable components thereof into liquid polymers, condensing the remaining vapors, subjecting said polymers independently of said reflux condensate to a separate conversion in the presence of hydrogen-containing gas under conditions adequate to convert a substantial portion thereof into gasoline of high anti-knock quality, returning and admixing the products of said conversion with the vapors entering the polymerizing zone.

2. A process of hydrocarbon oil conversion, which comprises subjecting oil to pyrolytic conversion under cracking conditions of temperature and superatmospheric pressure in a heating and reaction zone and converting a substantial portion thereof into gasoline solely by pyrolytic cracking, separating vapors from unvaporized residue, subjecting the vapors to reflux condensation to separate a vaporous fraction containing a substantial proportion of gasoline-like material, returning resultant reflux condensate to the heating zone, subjecting said fraction to polymerization of a character to convert unstable components thereof into liquid polymers, condensing the remaining vapors, subjecting said polymers independently of said reflux condensate to a separate conversion in the presence of hydrogen-containing gas under conditions adequate to convert a substantial portion thereof into gasoline of high anti-knock quality, recovering the products and utilizing as hydrogen-containing gas in said separate conversion at least a portion of the gas produced in the pyrolytic cracking.

3. A process of hydrocarbon oil conversion, which comprises subjecting oil to pyrolytic conversion under cracking conditions of temperature and superatmospheric pressure in a heating and reaction zone and converting a substantial portion thereof into gasoline solely by pyrolytic cracking, separating vapors from unvaporized residue, subjecting the vapors to reflux condensation to separate a vaporous fraction containing a substantial proportion of gasoline-like material, returning resultant reflux condensate to the heating zone, subjecting said fraction in a polymerizing zone to contact polymerization of a character to convert unstable components thereof into liquid polymers, condensing the remaining vapors, subjecting said polymers to a separate conversion in the presence of hydrogen-containing gas under conditions adequate to convert a substantial portion thereof into gasoline of high anti-knock quality, returning and admixing the products of said separate conversion with the vapors entering the polymerizing zone, and utilizing as hydrogen-containing gas in said separate conversion at least a portion of the gas produced in the pyrolytic cracking.

4. A hydrocarbon oil conversion process which comprises converting a substantial portion of the oil into gasoline solely by pyrolytic cracking, thereby forming fixed gases and vapors containing gasoline and unstable gum and color forming material, fractionating the vapors to condense and separate fractions thereof heavier than gasoline, separating said unstable material from the fractionated gasoline vapors and fixed gases by polymerization thereof into liquid, hydrogenating the resultant polymer liquid under conditions adequate to convert a substantial portion thereof into gasoline of high anti-knock quality, combining resultant gasoline products of the hydrogenation with gasoline products of the pyrolytic cracking, and supplying at least a portion of said gases to the hydrogenating operation as a source of hydrogen therefor.

5. A hydrocarbon oil conversion process which comprises converting a substantial portion of the oil into gasoline solely by pyrolytic cracking, thereby forming vapors containing gasoline and unstable gum and color forming material, fractionating the vapors to condense and separate fractions thereof heavier than gasoline, separating said unstable material from the fractionated gasoline vapors by polymerization thereof into liquid, hydrogenating the resultant polymer liquid under conditions adequate to convert a substantial portion thereof into gasoline of high anti-knock quality, combining resultant vapors with said fractionated gasoline vapors prior to the polymerization treatment of the latter, and finally condensing and collecting the vapors issuing from the polymerization treatment.

6. A hydrocarbon oil conversion process which comprises converting a substantial portion of the oil into gasoline solely by pyrolytic cracking, thereby forming vapors containing gasoline and unstable gum and color forming material, fractionating the vapors to condense and separate fractions thereof heavier than gasoline, separating said unstable material from the fractionated gasoline vapors by polymerization thereof into liquid, hydrogenating the resultant polymer liquid under conditions adequate to convert a substantial portion thereof into gasoline of high anti-knock quality, finally condensing said gasoline vapors after the polymerization treatment thereof and separating the resultant condensate from incondensable gases produced by the pyrolytic cracking, and supplying at least a portion of said gases to the hydrogenating operation as a source of hydrogen therefor.

7. In the conversion of hydrocarbon oils into gasoline solely by pyrolytic cracking wherein there is produced, in the fractionated overhead products of the cracking, hydrogen and olefinic hydrocarbons unsuitable as components of motor fuel, the method which comprises polymerizing said olefinic hydrocarbons into polymer liquid, and hydrogenating the latter with said hydrogen under conditions adequate to convert a substantial portion thereof into gasoline of high anti-knock quality.

8. In the conversion of hydrocarbon oils into gasoline solely by pyrolytic cracking, wherein there is produced a gasoline vapor containing unstable gum and color forming hydrocarbons and incondensable gases containing hydrogen, the method which comprises subjecting said vapor to a polymerization treatment of a character such as to separate said hydrocarbons therefrom as polymer liquid, and hydrogenating the latter with the hydrogen content of said gases under conditions adequate to convert a substantial portion thereof into gasoline of high anti-knock quality.

9. A process for producing more valuable products from olefinic hydrocarbons unsuitable as components of motor fuel and hydrogen formed in the pyrolytic cracking of hydrocarbon oils, which comprises polymerizing said olefinic hydrocarbons into polymer liquid, and hydrogenating the latter with said hydrogen formed by the pyrolytic cracking under conditions adequate to convert a substantial portion thereof into gasoline of high anti-knock quality.

JEAN DELATTRE SEGUY.